United States Patent [19]

Kazama

[11] 3,941,436
[45] Mar. 2, 1976

[54] BEARING FOR LIGHT ROTARY SHAFTS
[75] Inventor: Hachiro Kazama, Tokyo, Japan
[73] Assignee: Kabushiki Kaisha Ochiai Seisakusho, Tokyo, Japan
[22] Filed: Apr. 10, 1975
[21] Appl. No.: 566,687

[52] U.S. Cl. .................................................. 308/72
[51] Int. Cl.² ...................... F16C 9/06; F16C 23/00
[58] Field of Search ............... 308/72, 237 R, 237 A

[56] References Cited
UNITED STATES PATENTS

| | | | |
|---|---|---|---|
| 2,886,380 | 5/1959 | Lambeek | 308/72 |
| 3,437,386 | 4/1969 | Cole | 308/72 |
| 3,535,005 | 10/1970 | Orkin et al. | 308/72 |
| 3,754,802 | 8/1973 | Keller | 308/72 |

Primary Examiner—Lloyd L. King
Attorney, Agent, or Firm—Holman & Stern

[57] ABSTRACT

In this bearing for light rotary shafts, a metal receiving plate provided with a hemispherical recess of a diameter slightly larger than the outside diameter of a spherical bearing metal is formed, an annular felt impregnated with a lubricating oil is fitted to said metal receiving plate, the intermediate periphery of the spherical bearing metal is fitted to said annular felt, further an annular metal pressing plate having the edge part of an inner hole formed to be of an arc of a diameter slightly larger than the outside diameter of the spherical bearing metal is placed on said annular felt, the spherical bearing metal pressing plate by leaving a very slight clearance between it and the arc of the inner hole of said annular metal pressing plate and between it and the hemispherical recess of the metal receiving plate and the metal receiving plate and annular metal pressing plate are integrally combined with each other by filling an annular groove formed of the peripheral edge step part of the annular metal pressing plate and the inner peripheral surface of the metal receiving plate with an organic binder.

1 Claim, 3 Drawing Figures

PRIOR ART

BEARING FOR LIGHT ROTARY SHAFTS

This invention relates to a bearing to be used for a shaft supporting part of a light small diameter shaft of a shaft diameter less than 12 mm. and a light load as, for example, a rotary shaft bearing a light load of a small motor or the like.

There is already known a bearing of this kind wherein, as shown in FIG. 3, a spherical bearing metal 1 is resiliently pressed and fitted to a metal receiving plate 4 with a metal pressing spring plate 12. However, such bearing has defects that, as the metal pressing spring plate 12 is resiliently pressed in contact with the rough surface of the spherical bearing metal 1 made of such porous metal as a sintered alloy, the centerability is so low that, when a large force acts instantaneously by any chance or a cantilever load is applied as on a shaft in a belted power transmitter mechanism, the resilient pressing force of the metal pressing spring plate 12 acting on the spherical surface of the bearing metal will be unbalanced and the spherical bearing metal 1 will be likely to be moved in the direction in which the load acts, thus be caused to rock.

The present invention is an improvement made to eliminate the defects of such a conventional bearing.

The present invention shall be described more particularly with reference to the drawings, in which.

Figure 1:
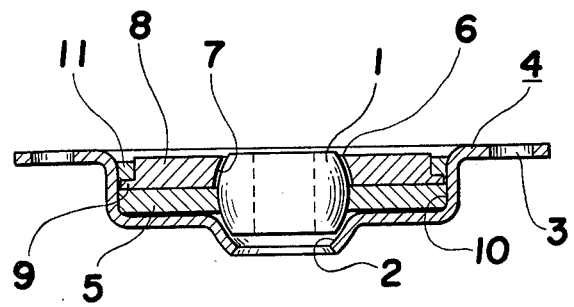
FIG. 1 is a vertically sectioned side view of an embodiment of the present invention.
Figure 2:
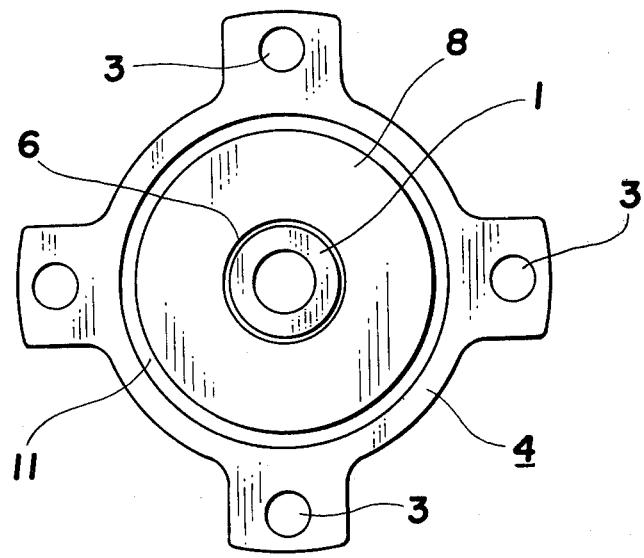
FIG. 2 is a plan view of the same.
Figure 3:
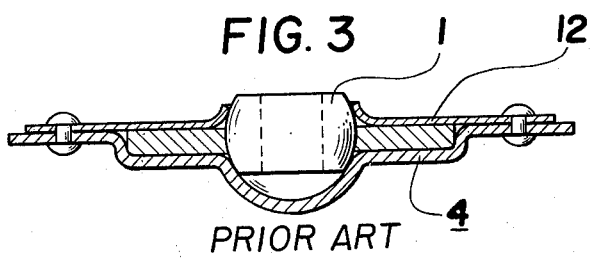
FIG. 3 is a vertically sectioned side view of a conventional product.

A metal receiving plate 4 provided with a hemispherical recess 2 of a diameter slightly larger than the outside diameter of a spherical bearing metal 1 and with a proper number of holes 3 in the peripheral edge part is formed. An annular felt 5 impregnated with a lubricating oil is fitted to said metal receiving plate 4. The intermediate periphery of the spherical bearing metal 1 is fitted to said annular felt 5. An annular metal pressing plate 8 having the edge part of an inner hole 6 formed to be of an arc 7 of a diameter slightly larger than the outside diameter of the spherical bearing metal 1 is placed on said annular felt 5. The spherical bearing metal 1 is held between the metal receiving plate 4 and annular metal pressing plate 8 by leaving a very slight clearance between it and the arc 7 of the inner hole of said annular metal pressing plate 8 and between it and the hemispherical recess 2 of the metal receiving plate 4. The metal receiving plate 4 and annular metal pressing plate 8 are integrally combined with each other by filling an annular proove formed of the peripheral edge step part 9 of the annular metal pressing plate 8 and the inner peripheral surface 10 of the metal receiving plate 4 with an organic binder 11.

The present invention is formed as mentioned above. The spherical bearing metal 1 has the annular felt 5 which is impregnated with a lubricating oil fitted to the intermediate periphery and is held between the metal receiving plate 4 and annular metal pressing plate 8 by deeping a very slight clearance so as to make about one self-rotation while a rotary shaft inserted through the spherical bearing metal 1 makes 100,000 rotations.

Further, the bearing of the present invention can be fixed to any required place through the holes 3 on the peripheral edge of the metal receiving plate 4.

In short, in the present invention, a metal receiving plate 4 provided with a hemispherical recess 2 of a diameter a little larger than the outside diameter of a spherical bearing metal 1 is formed. An annular felt 5 impregnated with a lubricating oil is fitted to said metal receiving plate 4. The intermediate periphery of the spherical bearing metal 1 is fitted to said annular felt 5. An annular metal pressing plate 8 having the edge part of an inner hole 6 formed to be of an arc 7 of a diameter larger than the outside diameter of the spherical bearing metal 1 is placed on said annular felt 5. The spherical bearing metal 1 is held between the metal receiving plate 4 and annular metal pressing plate 8 by leaving a slight clearance between it and the arc 7 of the inner hole of said annular metal pressing plate 8 and between it and the hemispherical recess 2 of the metal receiving plate 4. The metal receiving plate 4 and annular metal pressing plate 8 are integrally combined with each other by filling the peripheral edge step part 9 of the annular metal pressing plate 8 with an organic binder 11. Therefore, the spherical bearing metal 1 can be smoothly and lightly centered without being uselessly pressed by the metal receiving plate 4 and annular metal pressing plate 8. Even if a cantilever load is applied, the spherical bearing metal 1 will be supported by the annular metal pressing plate 8 without rocking. Further, as the annular metal pressing plate 8 is bonded and fixed to the metal receiving plate 4 through the organic binder 11, the vibration generated by the spherical bearing metal 1 can be absorbed by the binder so as to reduce noises.

What is claimed is:

1. A bearing for light rotary shafts wherein a metal receiving plate provided with a hemispherical recess of a diameter slightly larger than the outside diameter of a spherical bearing metal is formed, an annular felt impregnated with a lubricating oil is fitted to said metal receiving plate, the intermediate periphery of the spherical bearing metal is fitted to said annular felt, further an annular metal pressing plate having the edge part of an inner hole formed to be of an arc of a diameter slightly larger than the outside diameter of the spherical bearing metal is placed on said annular felt, the spherical bearing metal is held between the metal receiving plate and annular metal pressing plate by leaving a very slight clearance between it and the arc of the inner hole of said annular metal pressing plate and between it and the hemispherical recess of the metal receiving plate and the metal receiving plate and annular metal pressing plate are integrally combined with each other by filling an annular groove formed of the peripheral edge step part of the annular metal pressing plate and the inner peripheral surface of the metal receiving plate with an organic binder.

* * * * *